United States Patent [19]

Takahashi

[11] Patent Number: 5,290,110
[45] Date of Patent: Mar. 1, 1994

[54] DOCUMENT PROCESSING APPARATUS CAPABLE OF PRINTING MULTISIZED CHARACTERS

[75] Inventor: Tsutomu Takahashi, Kawasaki, Japan

[73] Assignee: Canon Kabushiki Kaisha, Tokyo, Japan

[21] Appl. No.: 935,347

[22] Filed: Aug. 28, 1992

Related U.S. Application Data

[63] Continuation of Ser. No. 643,085, Jan. 22, 1991, abandoned, which is a continuation of Ser. No. 318,337, Mar. 3, 1989, abandoned.

[30] Foreign Application Priority Data

Mar. 7, 1988 [JP] Japan .................... 63-051783

[51] Int. Cl.⁵ .................................... B41J 2/495
[52] U.S. Cl. .................................... 400/121; 395/102
[58] Field of Search ............ 400/121, 76; 340/730, 340/731, 735, 790; 395/102

[56] References Cited

U.S. PATENT DOCUMENTS

| | | | |
|---|---|---|---|
| 3,991,868 | 11/1976 | Robinson et al. | 400/121 |
| 4,203,154 | 5/1980 | Lampson et al. | 364/900 |
| 4,371,274 | 2/1983 | Jaeger | 400/121 |
| 4,511,267 | 4/1985 | Pokorny | 340/731 |
| 4,574,364 | 3/1986 | Tabata | 340/731 |
| 4,630,947 | 12/1986 | Yoshida | 400/76 |
| 4,649,379 | 3/1987 | Canton | 340/731 |
| 4,655,622 | 4/1987 | Aoki | 400/121 |
| 4,668,963 | 5/1987 | Tanabe et al. | 400/17 |
| 4,704,040 | 11/1987 | Takano | 400/121 |
| 4,707,153 | 11/1987 | Nishi | 400/76 |
| 4,829,453 | 5/1989 | Katsuta | 340/731 |
| 5,016,000 | 5/1991 | Bugg | 340/731 |

FOREIGN PATENT DOCUMENTS 120065 6/1985 Japan ......................... 400/76

Primary Examiner—David A. Wiecking
Assistant Examiner—Steven S. Kelley
Attorney, Agent, or Firm—Fitzpatrick Cella Harper & Scinto

[57] ABSTRACT

A document processing apparatus includes a keyboard for inputting character data having a normal character height character and data having a character height extending over a plurality of lines, a memory for storing the character data input by keyboard, a printer for outputting a character pattern corresponding to the character data stored in the memory in units of lines, and a central processing unit for, when character patterns of one line are output by the printer, causing the printer to directly output a character pattern corresponding to the character data having the normal character height and to output part of the character pattern corresponding to the character data having the character height extending over the plurality of lines.

16 Claims, 9 Drawing Sheets

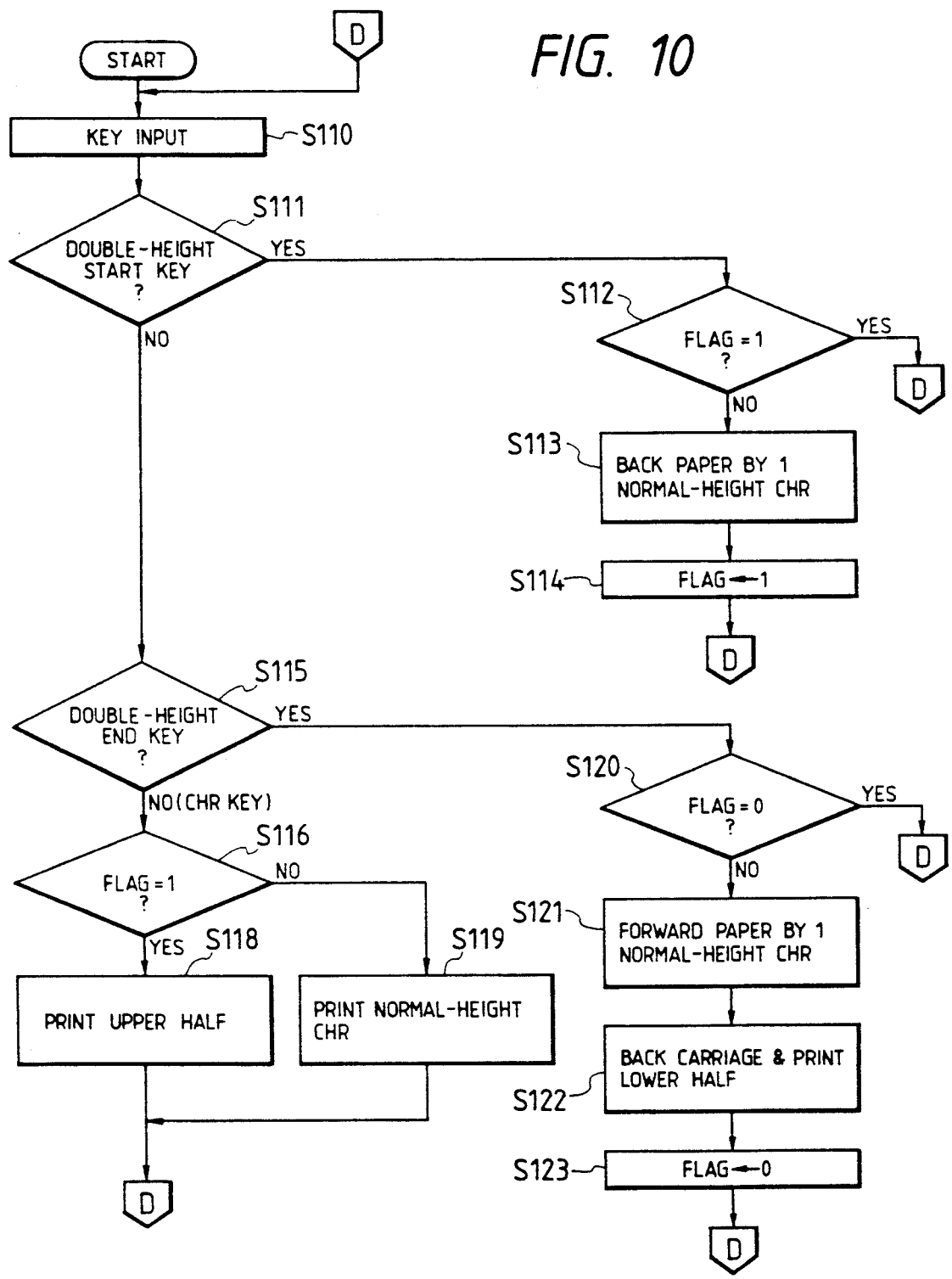

DOCUMENT PROCESSING APPARATUS CAPABLE OF PRINTING MULTISIZED CHARACTERS

This application is a continuation of application Ser. No. 643,085 filed Jan. 22, 1991, now abandoned; which is a continuation of Ser. No. 318,337 filed Mar. 3, 1989, now abandoned.

BACKGROUND OF THE INVENTION

1. Field of the Invention

The present invention relates to a document processing apparatus such as an electronic typewriter capable of inputting characters and printing the inputted characters.

2. Related Background Art

Two types of conventional typewriters are available which differ in their printing systems.

The first conventional typewriter employs a printing system for selecting a type corresponding to an input key from types arranged around the outer periphery of a daisy wheel and for performing printing using the selected type. The second conventional typewriter employs a printing system in which dot patterns constituting each character are stored in a nonvolatile memory, a dot pattern corresponding to an input character key is read out, and the input character is printed at a dot-matrix printing unit such as a thermal head.

The former typewriter has the advantage of performing high-quality printing of individual characters but has the disadvantage that the number of kinds of characters that can be printed is limited.

The latter typewriter has the advantage that it can print various kinds of characters (e.g., Ming types, Gothic types, and double-height characters) but has the disadvantage of poor printing quality. In recent years, along with improvements in printing heads, the number of dots constituting each dot pattern representing a character has increased. That is, printing quality of a character printed by this system can compete with that printed by the type of a daisy wheel printer.

In a conventional electronic typewriter employing a system for printing characters with dot patterns in units of lines, when a character (e.g., a double-height character) which extends over a plurality of lines is input, the printing head must print each character while vertically moving a sheet. Therefore, the printing time of each character is prolonged. In addition, when a plurality of characters extending over adjacent lines are to be printed on a single line, the sheet must be repeatedly vertically moved, thus causing a positional error during printing.

In order to eliminate the positional error, printing can be stopped until character information of one line is completely input, and printing in units of characters may be avoided. However, it then becomes impossible to check printing during typing, which simultaneity is an essential characteristic of typewriters.

SUMMARY OF THE INVENTION

It is an object of the present invention to provide a document processing apparatus wherein vertical movement of an output medium can be minimized when a character pattern (e.g., a double-height character) extending over a plurality of lines is output.

It is another object of the present invention to provide a document processing apparatus, wherein a character pattern (e.g., a double-height character) extending over a plurality of lines can be divided and output in units of lines.

It is still another object of the present invention to provide a document processing apparatus wherein the start and end positions of a character pattern (e.g., a double-height character) extending over a plurality of lines can be designated and the character pattern can be divided and output in units of lines in accordance with the designation of the start and end positions.

BRIEF DESCRIPTION OF THE DRAWINGS

FIG. 10 is a flow chart showing control processing contents of a third embodiment of the present invention.

DETAILED DESCRIPTION OF THE PREFERRED EMBODIMENTS

Preferred embodiments of the present invention will be described in detail with reference to the accompanying drawings.

General Description of Arrangement

Figure 1:
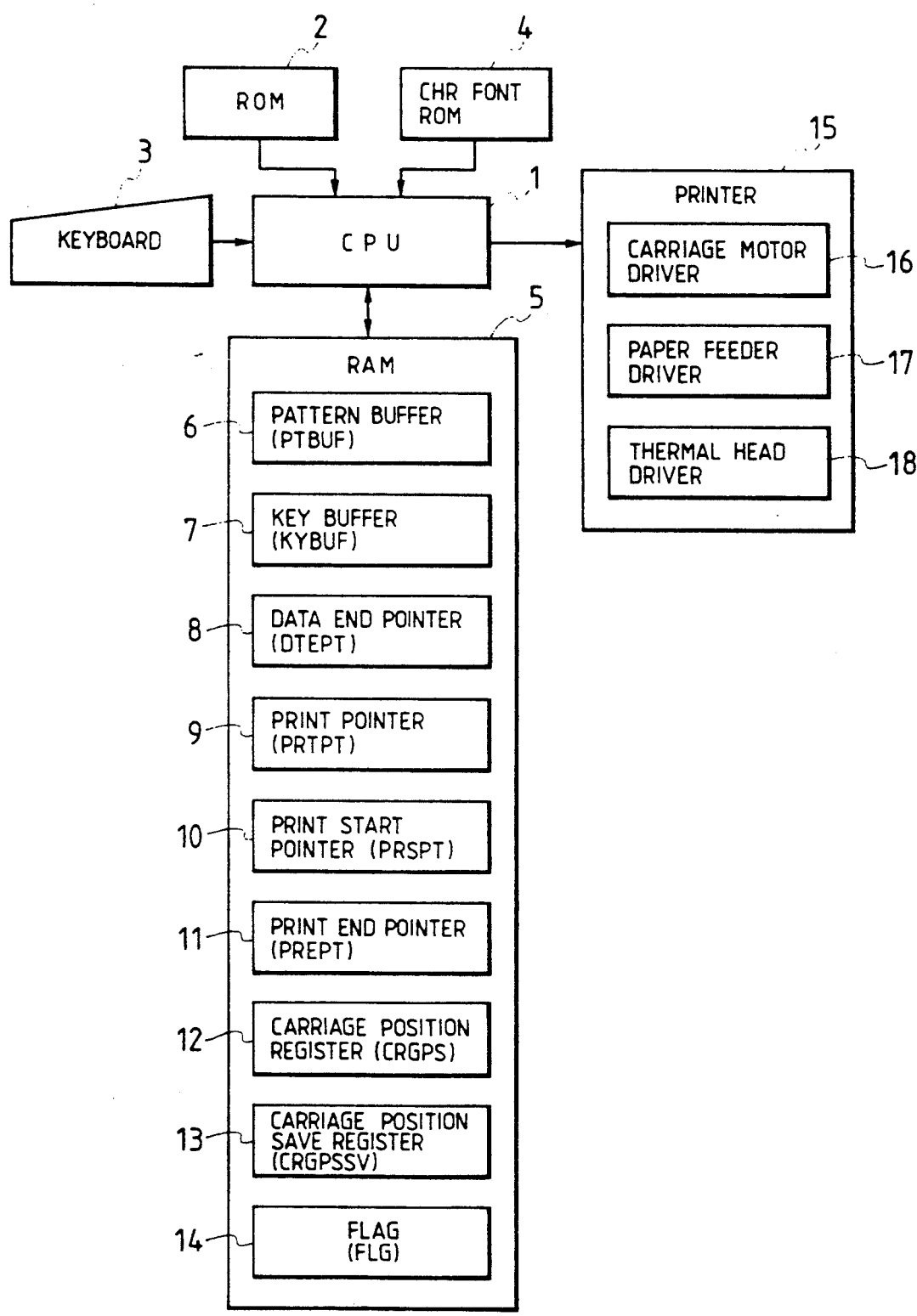
FIG. 1 is a schematic block diagram showing an arrangement of an electronic typewriter according to a first embodiment of the present invention.

FIG. 1 shows an arrangement of an electronic typewriter according to an embodiment of the present invention.

Figure 2:
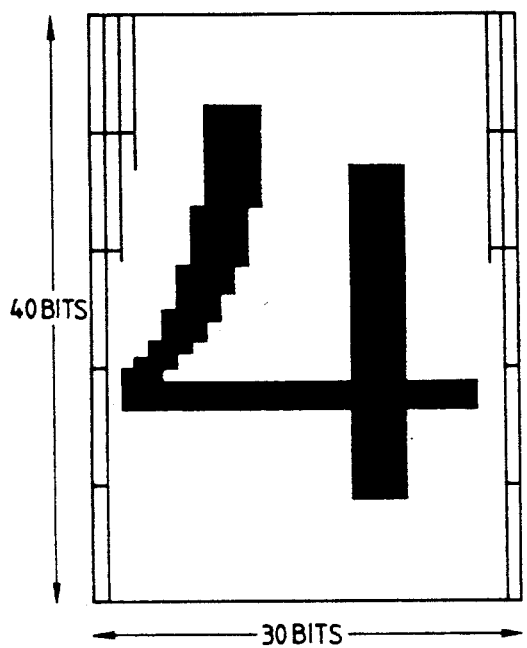
FIG. 2 is a view showing a dot format of a normal-height character pattern.
Figure 3:
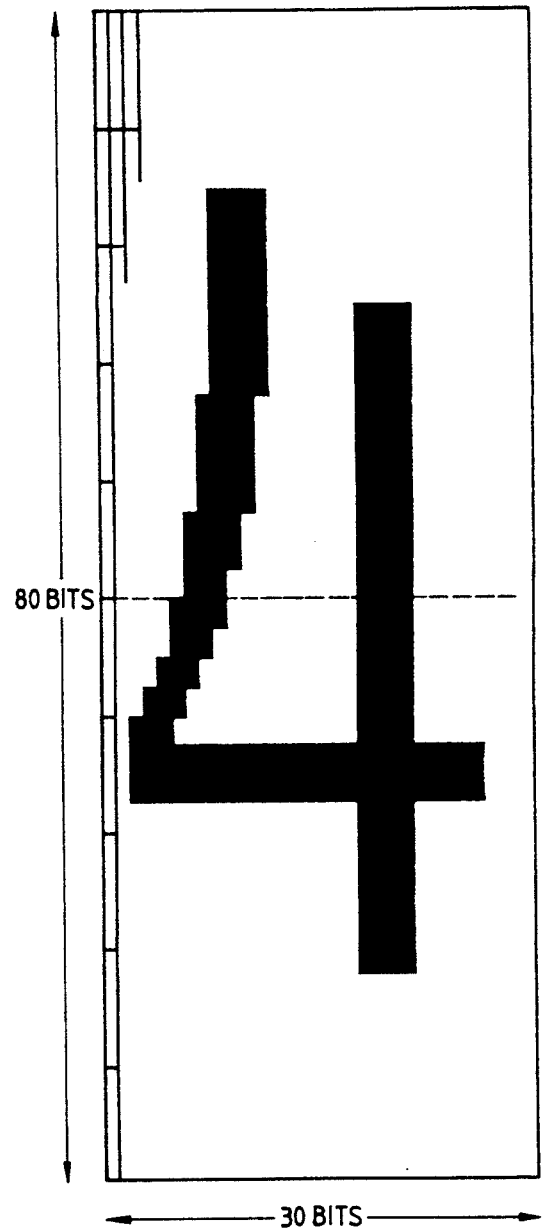
FIG. 3 is a view showing a dot format of a double-height character pattern.
Figure 4:
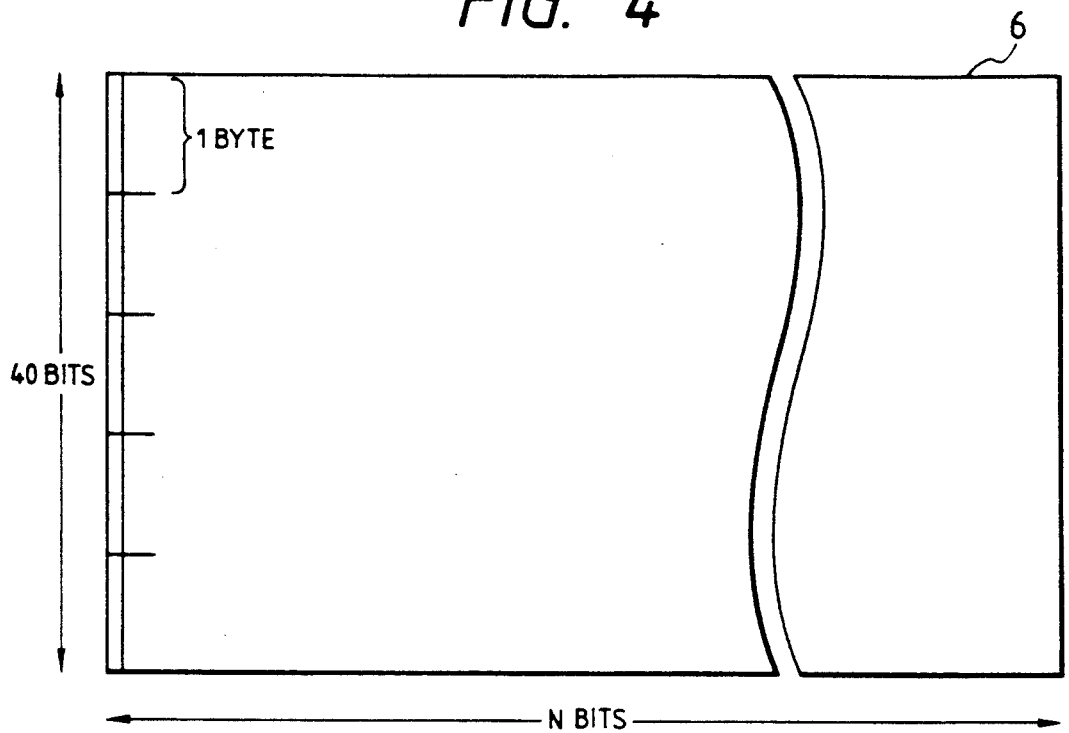
FIG. 4 is a memory map of a pattern buffer of the embodiment shown in FIG. 1.

A CPU 1 controls an overall operation of the electronic typewriter and is operated in accordance with programs (flow charts in FIGS. 6 and 7) stored in a ROM 2. A keyboard 3 includes keys corresponding to characters to be printed and various function keys (e.g., a double-height designation/cancel key). A character font ROM 4 stores various character typefaces. More specifically, the character font ROM 4 stores a character font pattern having a height of 40 dots (=5 bytes) and a width of 30 dots, as shown in FIG. 2, and a character font pattern having a height of 80 dots (=10 bytes) and a width of 30 dots, as shown in FIG. 3. When one dot in the character font pattern shown in FIG. 2 corresponds to two vertical dots, the character font pattern shown in FIG. 3 can be obtained. Therefore, two kinds of font patterns need not be stored in the character font ROM 4.

Referring back to FIG. 1, a RAM 5 serves as a work area for the CPU 1. The RAM 5 also includes the following areas in addition to a pattern buffer 6.

The pattern buffer (to be referred to as a PTBUF hereinafter) 6 is used to store a normal character (to be referred to as a normal-height character hereinafter) font pattern (40×30 dots). The pattern buffer 6 has a capacity of 5×N (N≧30) bytes having a height of 40 dots (=5 bytes) and a width of N bits. A key buffer (to be referred to as a KYBUF hereinafter) 7 stores all data input from the keyboard 3 as codes. A character font pattern corresponding to the code stored in the KYBUF 7 is generated by the character font ROM 4. The character font pattern is then stored in the PTBUF 6. A character font pattern of a double-height character is divided into upper and lower pattern portions which are stored in the character font ROM 4. A data end pointer (DTEPT) 8 stores a pointer (positional information) representing a position of the latest key code stored in the KYBUF 7. A print pointer (PRTPT) 9 stores a pointer representing a key code during printing. This key code is stored in the KYBUF 7. A print start pointer (PRSPT) 10 stores a pointer representing a start position of each character code extending over two lines. A print end pointer (PREPT) 11 stores a pointer representing an end position of each character code extending over two lines. A carriage position register (CRGPS) 12 stores positional information of a carriage in a printer 15 (to be described later). A carriage position save register (CRGPSSV) 13 stores character printing position information represented by the PRSPT 10. A flag (FLG) 14 stores information representing the lower or upper half of the character pattern when this character extends over two lines. If the lower half (or normal-height character) of the character is printed, "0" is stored in the FLG 14. Otherwise, it stores logic "1".

The printer 15 is exemplified as a thermal printer in this embodiment. The printer 15 includes a carriage motor driver 16 for horizontally driving a carriage and winding a thermal transfer ribbon during horizontal movement of the carriage having a thermal head thereon, a paper feeder driver 17 for vertically moving a printing sheet serving as a printing medium, and a thermal head driver 18 for heating dots of the thermal head in accordance with a pattern sent from the PTBUF 6.

Figure 5A:
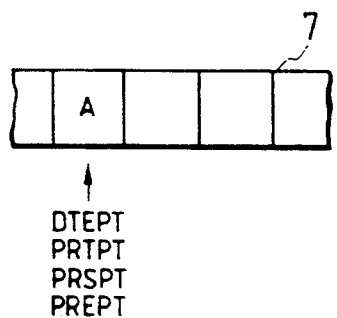
FIGS. 5A to 5C are views for explaining the shift of pointers during printing in the embodiment shown in FIG. 1.
Figure 5B:
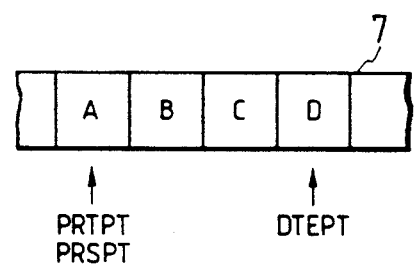
Figure 5C:
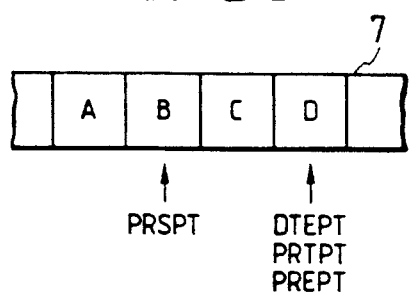

Description of Principle of Operation (FIGS. 5A to 5C)

The principle of operation of this embodiment having the above arrangement will be described below.

FIG. 5A shows states of the respective pointers when a double-height character "A" (i.e., a corresponding code in practice) is stored in the KYBUF 7 and the lower half of the double-height character "A" is printed by the printer 15. The pointers, i.e., the DTEPT 8, the PRTPT 9, the PRSPT 10, and PREPT 11 represent the character "A". FIG. 5B shows states of the pointers and the KYBUF 7 when a new double-height character string "B, C, D" is input at the keyboard 3 during printing of the character "A". Processing for storing the data input from the keyboard 3 in the KYBUF 7 is performed independently of printing processing. The DTEPT 8 is updated by the former input task, and other pointers are updated in the printing task. When the double-height character string "B, C, D" is input during printing of the character "A", the DTEPT 8 represents the character "D".

In the state of FIG. 5B, when the double-height character "A" is completely printed and the sheet is backed by a height of a double-height character, the upper halves of the double-height character string "B, C, D" are continuously printed under the control of the CPU 1. When the upper halves are completely printed, the states of the respective pointers are set, as shown in FIG. 5C. In this case, since the lower halves from the double-height character "B" are not printed, the PRSPT 10 points the double-height character "B", while the PREPT 11 points the last character "D" whose upper half is printed. Thereafter, the CPU 1 causes the carriage to back to the "B" position so as to print the lower halves of the double-height characters pointed by the PRSPT 10 to the PREPT 11. At the same time, the sheet is forwarded by a height of the double-height character, and the lower halves of the double-height character string are printed under the control of the CPU 1.

Figure 7B:
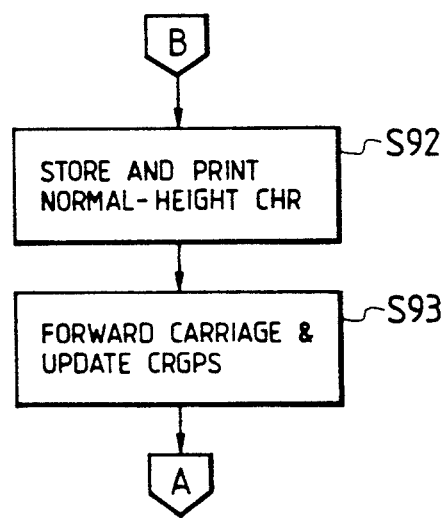
FIGS. 7A and 7B are flow charts of a printing task in the embodiment shown in FIG. 1.
Figure 7A:
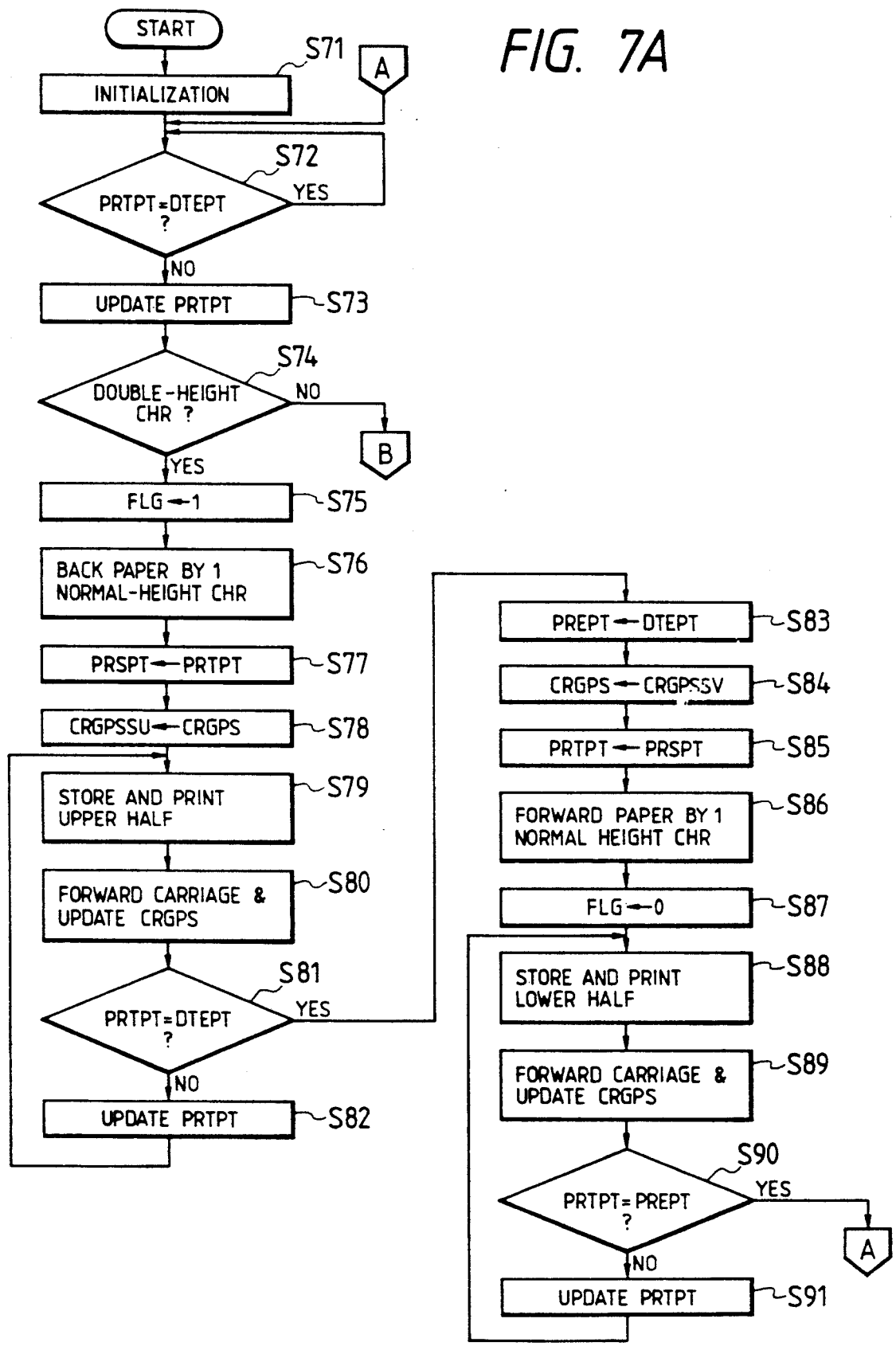

During the above processing, when a new double-height character is input while the upper halves of the double-height character string "B, C, D" are being printed, the new input is detected in step S81 in FIG. 7A. Therefore, the upper half of the latest input character is printed.

As can be apparent from the above description, when the double-height character string is continuously input, each double-height character is not printed, but upper halves of the double-height character string are continuously printed and then the lower halves are continuously printed. Therefore, vertical feed of the sheet can be minimized. In particular, the upper half of a new input double-height character input during printing of the upper half of the already input double-height character is printed continuously. Therefore, the above-mentioned effect can be further enhanced.

Figure 6:
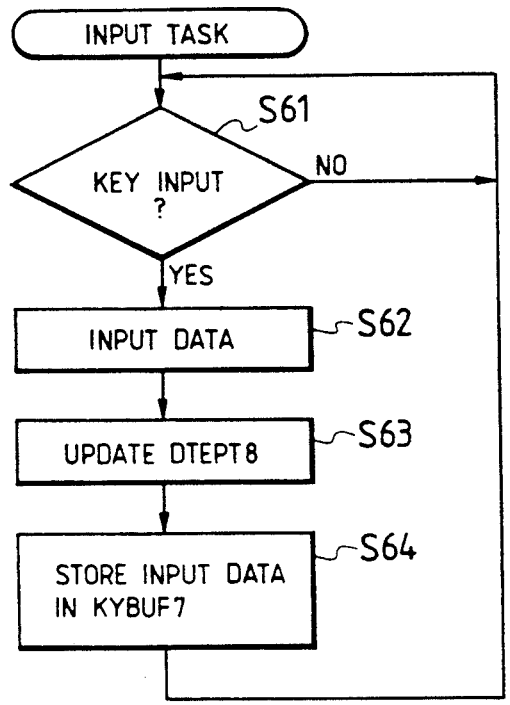
FIG. 6 is a flow chart of input task processing of the embodiment shown in FIG. 1.

Description of Processing Procedures (FIGS. 6 to 7B)

The processing procedures of the electronic typewriter of this embodiment can be described on the basis of the above principle, as shown in flow charts in FIGS. 6 to 7B. The procedures will be described below in order.

i) Description of Input Task

FIG. 6 is a flow chart showing a flow of input task processing.

The CPU 1 determines in step S61 whether an input is made at the keyboard 3. A loop is repeated until a key input is detected. When the key input is detected, the flow advances to step S62. Data (i.e., a character code) corresponding to the input key is input. In step S63, the DTEPT 8 is updated (incremented by one). The flow then advances to step S64. The input data is stored in the KYBUF 7 at a position designated by the DTEPT 8. The flow returns to step S61 for the next input.

ii) Description of Printing Task

A printing task will be described with reference to FIGS. 7A and 7B.

When a power switch of the typewriter is turned on, the CPU 1 initializes various peripheral elements and pointers in step S71. The CPU 1 then determines in step S72 whether the content of the PRTPT (print pointer) 9 is the same as that of the DTEPT (data end pointer) 8, i.e., whether a new data input is made. If YES in step S72, data to be printed is not stored in the KYBUF (key buffer) 7. The CPU 1 waits until this data is input.

When the CPU 1 detects that the data to be printed is stored in the KYBUF 7, the flow advances to step S73. The PRTPT 9 is updated (increased by one), and the CPU 1 determines in step S74 whether the data represented by the PRTPT 9 represents a double-height character. The data represented by the PRTPT 9 represents a double-height character hereinafter. In this case, the flow advances to step S75. The FLG 14 is set to be "1", and the sheet is backed by a height of a normal-height character to prepare for printing of the upper half of the double-height character in step S76. In step S77, the printing of the double-height character is started, and the content of the PRTPT 9 is substituted into the PRSPT 10. At the same time, the current carriage position (CRGPS 12) is temporarily saved in the CRGPSSV 13. The flow then advances to step S79. The upper half pattern of the double-height character stored in the KYBUF 7 and represented by the PRTPT 9 is stored in the PTBUF 6, and is printed. In step S80, the carriage is forwarded by one character, and the CRGPS 12 is updated. The CPU 1 then determines in step S81 whether the PRTPT 9 coincides with the DTEPT 8. If NO in step S81, i.e., if the content of the PRTPT 9 does not coincide with that of the DTEPT 8, the PRTPT 9 is updated in step S82. The flow then returns to step S79, and operations in steps S79 to S82 are repeated until the contents of the PRTPT 9 and the DTEPT 8 coincide with each other. The input task is kept executed during the above processing. When a new double-height character is input (i.e., when the DTEPT 8 is updated) during printing, the upper halves of the double-height characters are printed until the content of the input PRTPT 9 coincides with the content of the DTEPT 8.

When the CPU 1 determines that the contents of the PRTPT 9 and the DTEPT 8 coincide with each other, the flow advances to step S83 to print the lower halves of the double-height characters.

In step S83, the current content of the DTEPT 8 is substituted into the PREPT (print end pointer) 11, i.e., the last character position whose upper half is printed is stored in the PREPT 11. The carriage is backed to the position, data of which is temporarily saved in the CRGPSSV 13 (i.e., a substitution of the content of the CRGPSSV 13 into the CRGPS 12). The content of the PRSPT 10 is substituted into the PRTPT 9, and the start position of the double-height character string, the upper halves of which are printed, is set in the PRTPT 9. In step S86, the sheet is forwarded by a height of a normal-height character. When these operations are completed, preparation for printing the lower halves of the double-height character string is completed. Therefore, data "0" which represents the lower-half printing is set in the FLG 14 in step S87. In step S88, the lower half of the double-height character represented by the PRTPT 9 is stored in the PTBUF 6 and printed. In step S89, the carriage is forwarded by one character, and the CRGPS 12 is updated. In step S90, the CPU 1 determines whether the content of the PRTPT 9 coincides with that of the PREPT 11. If NO in step S90, the flow advances to step S91, and the PRTPT 9 is updated. The flow then returns to step S88. When the content of the PRTPT 9 coincides with that of the PREPT 11, the flow returns to step S72.

In the decision block of step S74, when the CPU 1 detects that the data represented by the PRTPT 9 represents a normal-height character, the flow advances to step S92. The normal-height character pattern represented by the PRTPT 9 is stored in the PTBUF 6, and printing is performed. The carriage is forwarded by one character in step S93, and the CRGPS 12 is updated. The flow then returns to step S72.

In the printing processing of this embodiment as described above, when double-height characters are sequentially input, all upper halves of the double-height characters are continuously printed, and the lower halves are then continuously printed. Therefore, vertical movement of the sheet can be minimized. In addition, even during printing of the upper halves of the double-height characters, the CPU can determine whether a new double-height character is input. The upper half of the newly input double-height character can also be printed continuously with the upper halves of the previously input double-height characters.

Figure 8A:
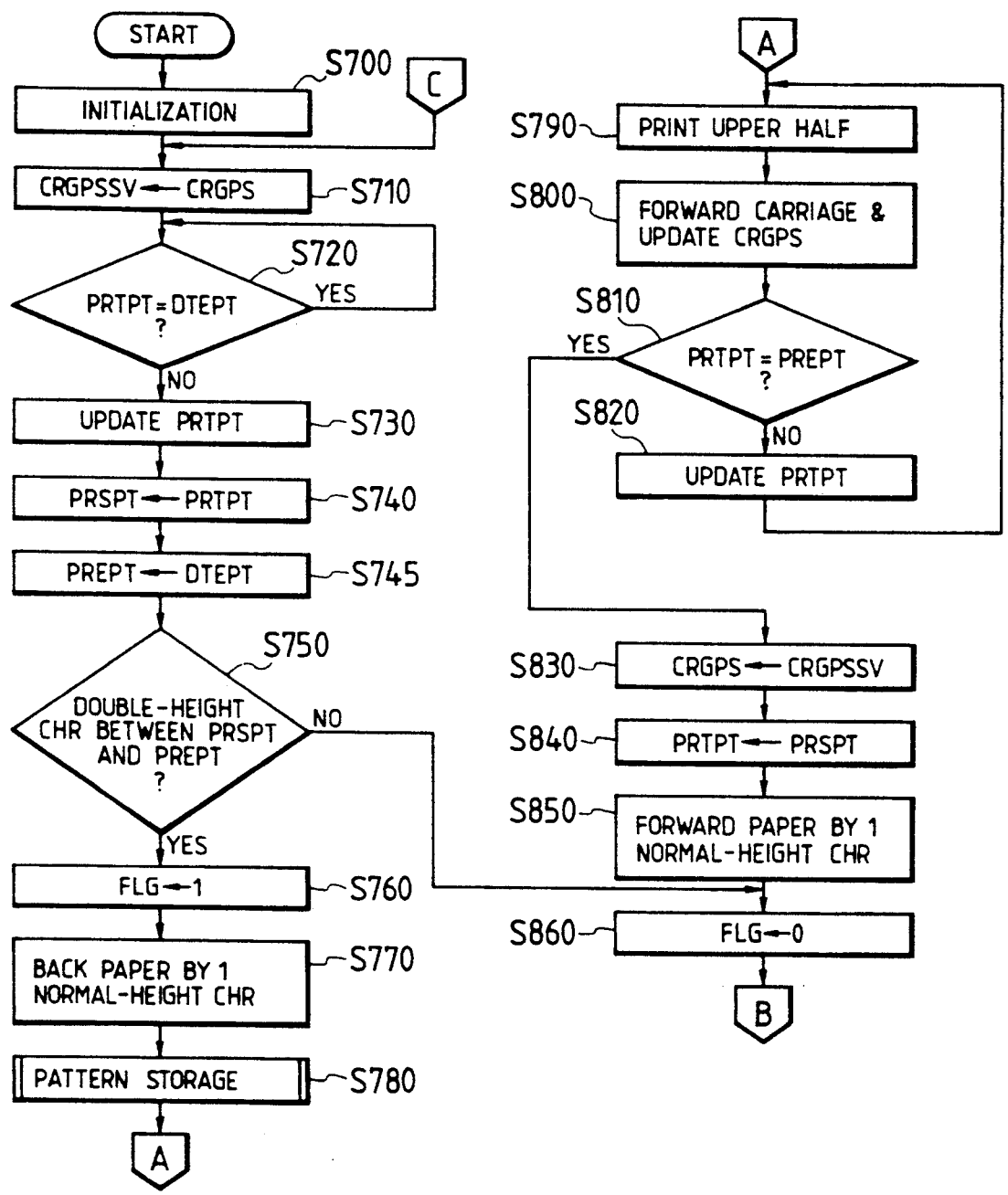
FIGS. 8A and 8B are flow sharts showing operation procedures in a second embodiment of the present invention.
Figure 8B:
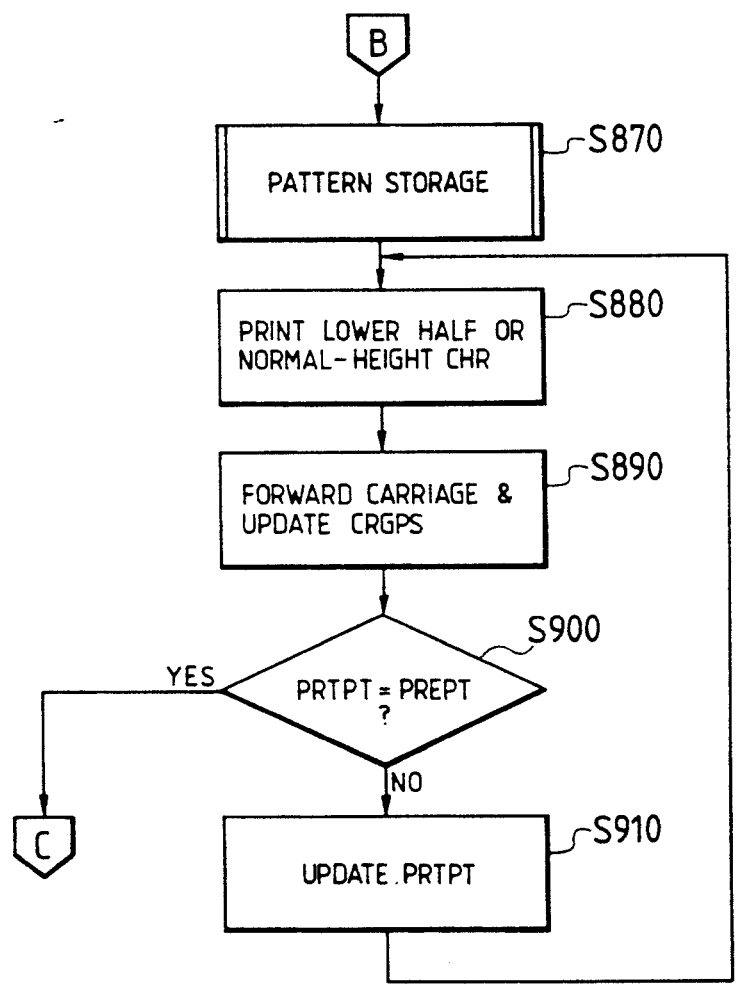
Figure 9:
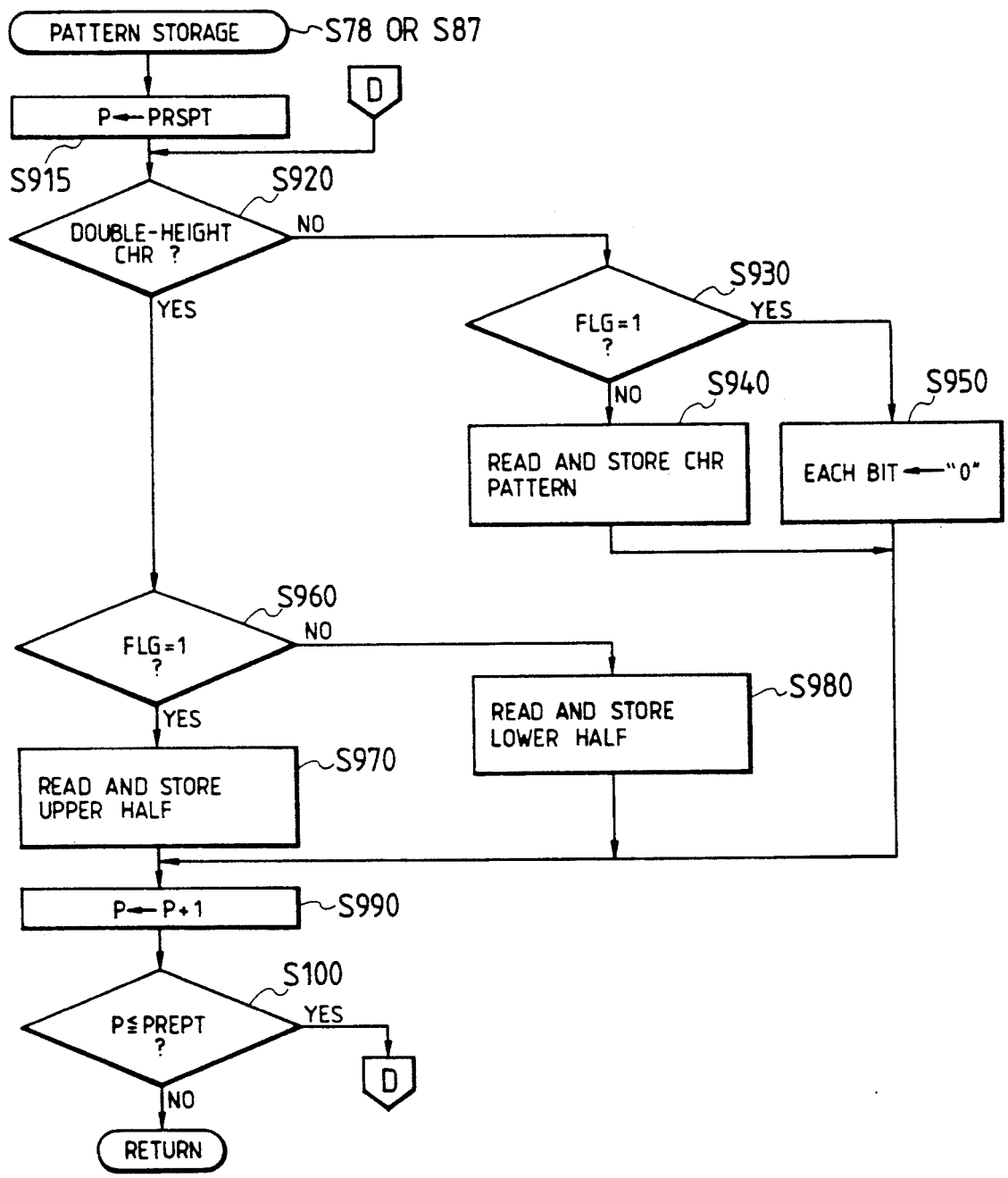
FIG. 9 is a flow chart showing pattern storage processing in the second embodiment.

Description of Second Embodiment (FIGS. 8A to 9)

The present invention is not limited to the particular embodiment described above. A second embodiment will be described with reference to flow charts in FIGS. 8A to 9. The circuit elements of this embodiment are based on those in FIG. 1. A plurality of character patterns (e.g., a one-line character pattern) can be stored in the pattern buffer (PTBUF) 6.

When a power switch of the electronic typewriter is turned on, various peripheral elements and points are initialized in step S700. The current carriage position (CRGPS 12) is substituted into a CRGPSSV 13 in step S710. In step S720, a CPU 1 determines whether the content of a PRTPT 9 coincides with that of a DTEPT (data end pointer) 8, i.e., whether nonprinted data is present. If NO in step S720, the CPU 1 waits until the content of the DTEPT 8 is updated by an input task.

However, if YES in step S720, the flow advances to step S730, and the PRTPT 9 is updated. In step S740, the content of the PRTPT 9 is substituted in a PRSPT 10. In step S745, the current content of the DTEPT 8 is substituted into a PREPT 11. A printing range is determined by the PRSPT 10 and the PREPT 11. The CPU 1 determines in step S750 whether a character code representing a double-height character is present between the positions represented by the PRSPT 10 and the PREPT 11. If at least one double-height character is detected to be present between the start and end positions, operations after step S760 for printing the upper half of the double-height character are performed. Otherwise, the operations in steps S760 to step S860 are not performed. In this case, an operation for printing the lower half (or a normal-height character) of the double-height character is performed in step S860. In the following description, assume that YES is obtained in step S750.

Data of an FLG 14 is set to be "1" (this meaning will be described later) in step S760. A paper feeder driver 17 is driven to back the sheet by the height of the normal-height character to print the upper half of the double-height character. A subroutine (the flow chart in FIG. 9, and its operations will be described in detail later) associated with pattern storage processing in step S780 is performed to store the character font pattern data in a PTBUF (pattern buffer) 6. When character pattern storage processing is completed, the flow advances to step S790. One character represented by the character pattern in the PRTPT 9 is printed. When printing of the upper half of one double-height character is completed, the carriage is forwarded by a pitch of one character and the content of the CRGPS (carriage position register) 12 is updated in step S800. In step S810, the contents of the PRTPT 9 and the PREPT 11 are compared with each other. When printing of the double-height character is completed, the flow advances to step S830. The carriage is backed to the position represented by the CRGPSSV 13 to prepare for printing of a double- or normal-height character. In step S840, the data of the PRSPT 10 is substituted into the PRTPT 9. In step S850, the paper feeder driver 17 is driven to feed the sheet by the height of the normal-height character. Therefore, the carriage can be backed to a state prior to upper-half printing of the double-height character.

The upper halves of the double-height characters in the nonprinted data are printed as described above. Printing of the lower halves of double-height character string including the normal-height characters is performed from step S860.

For this purpose, in step S860, the value of the FLG 14 is set to be "0". In step S870, the pattern storage processing (the same subroutine as in step S780) is performed. After this processing is completed, the lower halves of the characters or the normal-height characters which are represented by the PRTPT 9 are printed in step S880. In step S890, the carriage is forwarded by the pitch of one character, and the CRGPS 12 is updated. In step S900, the contents of the PRTPT 9 and the PREPT 11 are compared with each other. That is, the CPU 1 determines in step S900 whether the lower halves of the double-height character string including normal-height characters are printed. If NO in step S900, the flow returns to step S880. Printing is repeated until the contents of the PRTPT 9 and the PREPT 11 coincide with each other. When printing is completed, a series of printing operations are completed. The flow returns to step S710. When printing data is input at the keyboard by the operator during the above operations, the new input character string data can be simultaneously printed. Therefore, the sheet need not be repeatedly vertically moved. When characters are separately input at the keyboard, the number of nonprinted characters detected in step S730 is recognized as one character. Therefore, each character is printed while the operator checks the printed character.

Pattern storage processing in steps S780 and S870 will be described below.

Prior to execution (call) of a subroutine associated with pattern storage processing, the content of the FLG 14 is set to be "1" or "0". The FLG 14 serves as an index of this subroutine. More specifically, when this subroutine is executed while the FLG 14 is set to be "1", only the upper halves of the double-height characters included in the character string defined by the start and end positions represented by the PRSPT 10 and the PREPT 11 are stored in the PTBUF 6. However, when the FLG 14 is set to be "0", the character patterns of all normal-height characters or the lower halves of the double-height characters included in the character string defined by the start and end positions represented by the PRSPT 10 and the PREPT 11 are stored in the PTBUF 6.

A flow chart for realizing the above processing is shown in FIG. 9 and will be described below.

The content of the PRSPT 10 (print start data position) is stored in the pointer P in step S915. The CPU 1 determines in step S920 whether the data represented by the pointer P in the KYBUF 7 represents a double-height character. If NO in step S920, the flow advances to step S930. When the FLG 14 is set to be "1", the flow is branched to step S950. However, when the FLG 14 is set to be "0", the flow is branched to step S940. In step S940, the character pattern represented by the pointer P is read out from the character font ROM 4 and is stored in the PTBUF 6. However, when the FLG 14 is set to be "1", all data of 40×30 bits are set to be "0" and stored in the PTBUF 6.

In step S920, the CPU 1 determines that the data represented by the pointer P represents a double-height character, and the flow advances to step S960 and is branched into step S970 or S980 in accordance with the content of the FLG 14. That is, when the FLG 14 is set to be "1", the upper half of the character pattern represented by the pointer P is read and is stored in the PTBUF 6 in step S970. However, when the FLG 14 is set to be "0", the lower half of the double-height character is stored in the PTBUF 6 in step S980.

The character pattern represented by the pointer P is stored, and processing in step S990 is then performed. In step S990, the pointer P is incremented by one. The CPU 1 determines whether the content of the pointer P is smaller than that of the PREPT 11, i.e., whether the pattern storage is completed. If the CPU 1 determines that data prior to pattern storage is present, the flow advances to step S920. The above operations are then repeated. If condition P>PREPT 11 is established, the flow returns to the main flow from the pattern storage processing.

Description of Third Embodiment (FIG. 10)

In the above two embodiments, the input task and the printing task are simultaneously performed. However, the present invention is not limited to the above operation scheme. For example, only upper halves of characters input after depression of a double-height character start key on a keyboard 3 may be printed. When depression of the double-height release (or normal-height start) key is detected, all the lower halves may be continuously printed.

A flow chart for realizing the above operation is shown in FIG. 10 and will be described below. In order to realize this processing, a program shown in the flow chart of FIG. 10 is stored in a ROM 2. In the following description, data of "1" is stored in the flag in the double-height printing mode, while data "0" is stored in the normal-height printing mode. The flag is set to be "0" in an initial state (i.e., when the power switch is turned on).

In step S110, data is input from the keyboard 3. The CPU 1 determines in step S111 on the basis of the input data whether the double-height start key is depressed. If YES in step S111, the flow advances to step S112, and the content of the flag is checked. If the flag is determined to be "0", i.e., when the CPU 1 determines that the immediately preceding mode is the normal-height printing mode, the flow advances to step S113. The sheet is backed by the height of the normal-height character. In step S114, the flag is set to be "1", and the flow returns to step S110. When the CPU 1 detects in step S112 that the flag is already set to be "1", the sheet need not be further backed. In this case, no operations are performed, and the flow returns to step S110.

When the CPU 1 determines in step S111 on the basis of the input data that a key except for the double-height start key is depressed, the flow advances to step S115. The CPU 1 determines in this step whether the input key is the double-height cancel Key.

If any other key is determined to be depressed in step S115, it is determined that the data is obtained upon depression of a character key. The flow advances to step S116. In step S116, the content of the flag is determined. That is, when the content of the flag is "1", the flow advances to step S118, and the upper half of the double-height character corresponding to the input character key is printed. However, when the flag is set to be "0", the normal-height character corresponding to the input character key is printed.

When the CPU 1 detects depression of the double-height cancel key in step S115, the CPU 1 determines in step S120 whether the flag is set to be "0", i.e., whether the immediately preceding mode is the normal-height character printing mode. Therefore, when the flag is set to be "0", no changes occur in the printing mode. In this case, no operations are performed, and the flow returns to step S110. However, when the flag is set to be "1", the sheet is forwarded by the height of the normal-height character, and the carriage is backed to the start position where the upper half of the immediately preceding double-height character is printed. The lower half is then printed. When the above processing is completed, the flag is set to be "0" in step S123, and the flow returns to step S110.

According to this embodiment described above, the printing result can be checked upon every input. At the same time, when the input operations are performed at a relatively high speed and a plurality of printing data are input, vertical movement of the sheet required can be only for one character, thereby achieving high-speed printing and preventing positional errors in printing.

According to the embodiment described above, one-line printing is performed when printing data of a plurality of lines are continuously input, and thereafter remaining lines are printed. Therefore, the printing speed can be increased, and positional errors in printing can be reduced.

In the above embodiment, a character extending over a plurality of lines is exemplified by a double-height character, but is not limited thereto. A triple-height character or a character having a height four times that of the normal-height character can also be processed by the present invention.

According to the present invention as has been described above, when data to be printed which extends over a plurality of lines is present in a plurality of input data, printing of the plurality of data is performed in units of lines. Therefore, positional errors in printing can be minimized, and the printing speed can be increased.

What is claimed is:

1. A document processing apparatus comprising;
   means for inputting character data representing a character having a normal character height and character data representing a character having a character height extending over a plurality of lines;
   means for storing the character data input by said inputting means;
   means for outputting a character pattern corresponding to the character data stored in said storing means; and
   control means for causing said outputting means to output a character pattern character by character each time the character data of one character is input by said inputting means,
   wherein said control means controls said outputting means, for a character pattern corresponding to the character data representing a character having a normal character height, to output that character pattern corresponding to the character data representing a character having a normal character height in its entirety and, for a character pattern corresponding to character data representing a character having a character height extending over the plurality of lines, to output in one line a part of that character pattern corresponding to the character data representing a character having a character height extending over a plurality of lines and to output the rest of that character pattern in another line, said another line also containing respective character patterns corresponding to the character data representing a character having a normal character height to be output in its entirety.

2. An apparatus according to claim 1, wherein said outputting means is a printer.

3. An apparatus according to claim 1, further including character pattern storing means for storing the character pattern representing a character having the normal character height and the character pattern representing a character having the character height extending over the plurality of lines.

4. A document processing apparatus comprising:
   means for inputting character data representing a character having a normal character height and character data representing a character having a character height extending over a plurality of lines;
   means for storing the character data input by said inputting means;
   means for outputting a character pattern corresponding to the character data stored in said storing means;
   means for determining whether the character data stored in said storing means represents a character having a normal height or represents a character having a character height extending over the plurality of lines; and
   control means for causing said outputting means to output a character pattern character by character each time the character data of one character is input by said inputting means,
   wherein said control means controls said outputting means, for a character pattern corresponding to the character data determined to represent a character having a normal character height by said determining means, to output that character pattern corresponding to the character data representing a character having a normal character height in its entirety, and for a character pattern corresponding to character data determined to represent a character having a character height extending over a plurality of lines by said determining means, to output in one line a part of that character pattern corresponding to the character data representing a character having a character height extending over a plurality of lines and to output the rest of that character pattern in another line, said another line also containing respective character patterns corresponding to the character data representing a character having a normal character height to be output in its entirety.

5. An apparatus according to claim 4, wherein said outputting means is a printer.

6. An apparatus according to claim 4, further including character pattern storing means for storing the character pattern representing a character having the normal character height and the character pattern representing a character having the character height extending over the plurality of lines.

7. A document processing apparatus comprising:

means for inputting character data;

means for instructing output of a character pattern corresponding to character data representing a character having a character height extending over a plurality of lines input by said inputting means; and control means for causing outputting means to output a character pattern character by character each time the character data of one character is input by said inputting means, wherein said control means controls the outputting means to output in one line a part of the character pattern representing a character having a character height extending over the plurality of lines, corresponding to the character data input by said inputting means in response to an instruction by said instruction means and to output the rest of that character pattern in another line, said another line also containing respective character patterns corresponding to the character data representing a character having a normal character height to be output in its entirety.

8. An apparatus according to claim 7, wherein said outputting means is a printer.

9. An apparatus according to claim 7, further including character pattern storing means for storing the character pattern representing a character having the normal character height and the character pattern representing a character having the character height extending over the plurality of lines.

10. An apparatus according to claim 7, further including means for storing character data input by said inputting means.

11. An apparatus according to claim 7, further including means for canceling the output instruction instructing output of the character pattern corresponding to character data representing a character having a character height extending over the plurality of lines by said instructing means.

12. A document processing apparatus comprising:

means for inputting character data representing a character having a normal character height and character data representing a plurality of characters having a character height extending over a plurality of lines;

means for storing the character data input by said inputting means;

a carriage having a printing head for printing a character pattern corresponding to the character data stored in said storing means on a recording medium;

means for moving said carriage; and control means for causing said moving means to move said carriage and for causing said printing head to print a character pattern character by character each time the character data of one character is input by said inputting means, wherein said control means controls said printing head, for a character pattern corresponding to the character data representing a plurality of characters each having a character height extending over the plurality of lines, to print a part of those character patterns corresponding to the character data representing characters each having a character height extending over a plurality of lines and to print the rest of those character patterns when printing data at another line.

13. An apparatus according to claim 12, further including character pattern storing means for storing the character pattern representing a character having the normal character height and the character pattern representing a character having the character height extending over the plurality of lines.

14. A document processing apparatus comprising:

means for inputting a character data;

means for outputting a character pattern corresponding to character data each time character data of one character in input by said inputting means; and means for controlling said outputting means, for a character pattern corresponding to character data representing a character having a normal character height, to output that character pattern corresponding to a character data representing a character having a normal character height in its entirety and for a character pattern corresponding to character data representing a character having a character height extending over a plurality of lines, to output in one line a part of that character pattern corresponding to character data representing a character having a character height extending over a plurality of lines and to output the rest of that character pattern in another line, said another line also containing respective character patterns corresponding to the character data representing a character having a normal character height to be output in its entirety.

15. An apparatus according to claim 14, wherein said outputting means comprises a printer.

16. An apparatus according to claim 14, further comprising memory means for storing a character pattern representing a character having the normal character height and a character pattern representing a character having the character height extending over the plurality of lines.

* * * * *

UNITED STATES PATENT AND TRADEMARK OFFICE
CERTIFICATE OF CORRECTION

PATENT NO. : 5,290,110
DATED : March 1, 1994
INVENTOR(S) : TSUTOMU TAKAHASHI

It is certified that error appears in the above-indentified patent and that said Letters Patent is hereby corrected as shown below:

On the title page: Item

[56] Attorney, Agent, or Firm
"Fitzpatrick Cella Harper & Scinto" should read
--Fitzpatrick, Cella, Harper & Scinto--.

COLUMN 9
Line 49, "comprising;" should read --comprising:--.

Signed and Sealed this

Sixteenth Day of August, 1994

Attest:

BRUCE LEHMAN

Attesting Officer     Commissioner of Patents and Trademarks